United States Patent
Iwakiri (10) Patent No.: US 8,267,796 B2
(45) Date of Patent: Sep. 18, 2012

(54) GAME MACHINE, GAME MACHINE CONTROL METHOD, AND INFORMATION STORAGE MEDIUM

(75) Inventor: Takeshi Iwakiri, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1060 days.

(21) Appl. No.: 12/159,038

(22) PCT Filed: Nov. 2, 2006

(86) PCT No.: PCT/JP2006/322001
§ 371 (c)(1),
(2), (4) Date: Jun. 24, 2008

(87) PCT Pub. No.: WO2007/074581
PCT Pub. Date: Jul. 5, 2007

(65) Prior Publication Data
US 2009/0312097 A1   Dec. 17, 2009

(30) Foreign Application Priority Data
Dec. 26, 2005  (JP) .................................. 2005-372908

(51) Int. Cl.
*A63F 13/00*   (2006.01)
(52) U.S. Cl. .................... 463/43; 463/1; 463/30; 463/42
(58) Field of Classification Search ................ 463/1, 30, 463/35, 42, 43
See application file for complete search history.

(56) References Cited

U.S. PATENT DOCUMENTS

| 4,342,454 A * | 8/1982 | Baer et al. ........................ 463/31 |
| 5,462,275 A * | 10/1995 | Lowe et al. ........................ 463/4 |
| 5,828,809 A | 10/1998 | Chang et al. |
| 6,606,689 B1 | 8/2003 | Cheng et al. |
| 6,699,127 B1 * | 3/2004 | Lobb et al. ........................ 463/43 |
| 6,722,988 B2 * | 4/2004 | Yamaguchi ...................... 463/35 |
| 6,769,987 B1 * | 8/2004 | Morita et al. .................... 463/31 |

(Continued)

FOREIGN PATENT DOCUMENTS

EP   1 666 108 A1   6/2006
(Continued)

OTHER PUBLICATIONS

Search Report for corresponding Taiwanese Patent Application No. 095142017, dated Oct. 12, 2009.

*Primary Examiner* — David L Lewis
*Assistant Examiner* — Shauna-Kay Hall
(74) *Attorney, Agent, or Firm* — Sughrue Mion, PLLC (57) ABSTRACT

To provide a game machine capable of reducing a sense of discomfort which the user feels due to unmatched image display timing and image-related sound output timing. An image reproduction unit (highlight scene image reproduction control unit (72)) reproduces an image. An image-related sound reproduction unit (comment sound reproduction control unit (78)) reproduces an image-related sound corresponding to the image. A reproduction state determination unit (76) determines whether or not the reproduction state of the image and that of the image-related sound corresponding to the image satisfy a predetermined condition. Based on a result of a determination by the reproduction state determination unit (76), a reproduction state describing sound reproduction control unit (80) reproduces a reproduction state describing sound which describes the reproduction state of the image and/or image-related sound.

12 Claims, 7 Drawing Sheets

U.S. PATENT DOCUMENTS

| | | | |
|---|---|---|---|
| 6,949,023 B1 * | 9/2005 | Okubo et al. | 463/30 |
| 2002/0046401 A1 * | 4/2002 | Miyazaki et al. | 725/32 |
| 2002/0132667 A1 | 9/2002 | Shoji | |
| 2003/0182663 A1 | 9/2003 | Gudorf et al. | |
| 2004/0254017 A1 | 12/2004 | Cheng et al. | |

FOREIGN PATENT DOCUMENTS

| | | |
|---|---|---|
| JP | 2001-129251 A | 5/2001 |
| JP | 3209988 B2 | 7/2001 |
| JP | 2002-058870 A | 2/2002 |
| JP | 2002-239225 A | 8/2002 |
| JP | 2003-024626 A | 1/2003 |
| JP | 2004-329357 A | 11/2004 |
| JP | 2005-087260 A | 4/2005 |
| JP | 2005-245795 A | 9/2005 |
| TW | 571812 | 1/2004 |
| TW | I232768 B | 5/2005 |

* cited by examiner

| ID | TIME | PLAY TYPE | REPLAY DATA |
|---|---|---|---|
| 1 | FIRST HALF 21 MINS | SHOOT AND SCORE | REPLAY DATA 1 |
| 2 | FIRST HALF 43 MINS | SHOOT WITHOUT SCORING | REPLAY DATA 2 |
| 3 | SECOND HALF 10 MINS | CORNER KICK NOT RESULTING IN SHOT | REPLAY DATA 3 |
| 4 | SECOND HALF 14 MINS | SHOOT WITHOUT SCORING | REPLAY DATA 4 |
| 5 | SECOND HALF 35 MINS | SHOOT AND SCORE | REPLAY DATA 5 |
| 6 | SECOND HALF 40 MINS | SHOOT WITHOUT SCORING | REPLAY DATA 6 |

FIG.6

| PLAY TYPE | COMMENT SOUND DATA |
|---|---|
| SHOOT AND SCORE | COMMENT SOUND DATA A |
| SHOOT WITHOUT SCORING | COMMENT SOUND DATA A |
| ... | ... |

FIG.7

| REPRODUCTION STATE OF HIGHLIGHT SCENE IMAGE | REPRODUCTION STATE DESCRIBING SOUND DATA |
|---|---|
| REPRODUCTION COMPLETED | REPRODUCTION STATE DESCRIBING SOUND DATA A "AS SHOWN EARLIER ON THE SCREEN" |
| REPRODUCTION IN PROCESS | REPRODUCTION STATE DESCRIBING SOUND DATA B "AS SHOWN NOW ON THE SCREEN" |
| NOT REPRODUCED YET (TO BE REPRODUCED NEXT) | REPRODUCTION STATE DESCRIBING SOUND DATA C "AS MAY APPEAR SHORTLY ON THE SCREEN" |
| NOT REPRODUCED YET (NOT TO BE REPRODUCED NEXT) | REPRODUCTION STATE DESCRIBING SOUND DATA D "AS MAY BE SHOWN LATER ON THE SCREEN" |

FIG.8

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

In game machines, while an image is shown on a monitor, a sound concerning the image may be output via a speaker. In a sport game, for example, like real TV sport match broadcasting, a replay image of a scene where a specific play (shooting, for example) happens may be reproduced on the monitor as a highlight scene after the match ends, and a sound relating to that replay image (for example, the sound of a comment made by a commentator or the like on the highlight scene) is output via the speaker, whereby the excitement of the game can be enhanced.
Patent Document 1: Japanese Patent No. 3209988

DISCLOSURE OF THE INVENTION

Problems to be Solved by the Invention

In a game machine such as is described above, it is preferable that display of an image is synchronized with output of a sound relating to that image (an image-related sound) so that the timing at which to display the image coincides with the timing at which to output the sound. However, as a complicated process may be required in realizing such synchronization, the above-described game machine for a sport game may display a replay image and output the sound relating to that replay image while the timing at which to display the replay image and that at which to output the replay image-related sound are not necessarily matched. In such a case, the user (the game player) may feel uncomfortable due to the unmatched replay scene shown on the monitor and sound output via the speaker.

The present invention has been conceived in view of the above, and aims to provide a game machine, a game machine control method, and an information storage medium for imparting a reduced sense of discomfort to the user due to the unmatched image display timing and image-related sound output timing.

Means for Solving the Problem

In order to address the above-described problem, according to one aspect of the present invention, there is provided a game machine, comprising image reproduction means for reproducing an image; image-related sound reproduction means for reproducing an image-related sound corresponding to the image; reproduction state determination means for determining whether or not a reproduction state of the image and a reproduction state of the image-related sound corresponding to the image satisfy a predetermined condition; and reproduction state describing sound reproduction means for reproducing, based on a result of a determination by the reproduction state determination means, a reproduction state describing sound which describes the reproduction state of the image and/or the image-related sound.

According to another aspect of the present invention, there is provided a game machine control method comprising, an image reproduction step of reproducing an image; an image-related sound reproduction step of reproducing an image-related sound corresponding to the image; a reproduction state determination step of determining whether or not a reproduction state of the image and a reproduction state of the image-related sound corresponding to the image satisfy a predetermined condition; and a reproduction state describing sound reproduction step of reproducing, based on a result of a determination made at the reproduction state determination step, a reproduction state describing sound which describes the reproduction state of the image and/or the image-related sound.

According to still another aspect of the present invention, there is provided a program for causing a computer, including a consumer game machine, a portable game machine, a commercial game machine, a portable phone, a personal digital assistant (PDA), and a personal computer, to function as a game machine, the computer functioning as image reproduction means for reproducing an image; image-related sound reproduction means for reproducing an image-related sound corresponding to the image; reproduction state determination means for determining whether or not a reproduction state of the image and a reproduction state of the image-related sound corresponding to the image satisfy a predetermined condition; and reproduction state describing sound reproduction means for reproducing, based on a result of a determination by the reproduction state determination means, a reproduction state describing sound which describes the reproduction state of the image and/or the image-related sound.

An information storage medium according to the present invention is a computer readable information storage medium which stores the above-described program. A program distribution device according to the present invention comprises an information storage medium which stores the above-described program, reads the program from the information storage medium, and distributes the program. A program distribution method according to the present invention uses an information storage medium which stores the above-described program, reads the program from the information storage medium, and distributes the program.

According to the present invention, an image is reproduced. Also, an image-related sound corresponding to the image is reproduced. Then, according to the present invention, whether or not the reproduction state of the image and that of the image-related sound corresponding to the image satisfy a predetermined condition is determined, and a reproduction state describing sound which describes the reproduction state of the image and/or image-related sound is reproduced based on the result of the determination. According to the present invention, a sense of discomfort which the user feels due to the unmatched image display timing and image-related sound output timing can be reduced.

In one embodiment of the present invention, the reproduction state determination means may include first determination means for determining whether or not the reproduction state of the image-related sound is of a predetermined state, and second determination means for determining, in the case where the first determination means determines that the reproduction state of the image-related sound is of the predetermined state, whether or not the reproduction state of an image corresponding to the image-related sound satisfies a predetermined reproduction state condition, and the reproduction state describing sound reproduction means may reproduce, based on a result of a determination by the second determination means, the reproduction state describing sound which describes the reproduction state of the image. With the above, in the case where the reproduction state of the image-related sound is of a predetermined state (for example, a state where reproduction of that image-related sound begins or where the image-related sound is being reproduced, and so forth), it is possible to output a reproduction state describing sound which describes the reproduction state of the image corresponding to the image-related sound based on the reproduction state of that image.

In another embodiment of the present invention, the game machine may comprise reproduction state describing sound data storage means for storing reproduction state describing sound data for reproducing the reproduction state describing sound, in association with the reproduction state condition, wherein the second determination means may determine, in the case where the first determination means determines that the reproduction state of the image-related sound is of the predetermined state, whether or not the reproduction state of the image corresponding to the image-related sound satisfies a reproduction state condition associated with the reproduction state describing sound data, and the reproduction state describing sound reproduction means may reproduce, as the reproduction state describing sound, a sound based on the reproduction state describing sound data stored in the reproduction state describing sound data storage means in association with the reproduction state condition determined by the second determination means as satisfying the reproduction state condition. With the above, when the reproduction state of the image-related sound is of a predetermined state, it is possible to output a reproduction state describing sound having content in accordance with the reproduction state of the image corresponding to the image-related sound.

In still another embodiment of the present invention, the reproduction state condition may include at least one of a condition concerning whether or not the image is in a state of having been reproduced, a condition concerning whether or not the image is in a state of being reproduced, and a condition concerning whether or not the image is in a state of having not been reproduced yet. With the above, when the reproduction state of the image-related sound is of a predetermined state, it is possible to output a reproduction state describing sound indicating that the image corresponding to the image-related sound has been reproduced, a reproduction state describing sound indicating that the image corresponding to the image-related sound is being reproduced, or a reproduction state describing sound indicating that the image corresponding to the image-related sound is yet to be reproduced.

In still another embodiment of the present invention, the image reproduction means may sequentially reproduce a plurality of images in a predetermined order, and the reproduction state condition may include a condition concerning relation in order, in the case where the first determination means determines that the reproduction state of the image-related sound is of the predetermined state, between the image corresponding to the image-related sound and the image being reproduced by the image reproduction means. With the above, when the reproduction state of the image-related sound is of a predetermined state, it is possible to output a reproduction state describing sound which describes relation in order between the image corresponding to the image-related sound and the image being reproduced at that time.

In still another embodiment of the present invention, the reproduction state determination means may include third determination means for determining whether or not a reproduction state of the image is of a predetermined state, and fourth determination means for determining, in the case where the third determination means determines that the reproduction state of the image is of the predetermined state, whether or not the reproduction state of the image-related sound corresponding to the image satisfies a predetermined reproduction state condition, and the reproduction state describing sound reproduction means may reproduce, based on a result of a determination by the fourth determination means, the reproduction state describing sound which describes the reproduction state of the image-related sound. With the above, when the reproduction state of the image is of a predetermined state (for example, the state where reproduction of the image begins or where the image is being reproduced, and so forth), it is possible to output a reproduction state describing sound which describes the reproduction state of the image-related sound corresponding to the image based on the reproduction state of the image-related sound.

In still another embodiment of the present invention, the game machine may further comprise reproduction state describing sound data storage means for storing reproduction state describing sound data for reproducing the reproduction state describing sound, in association with the reproduction state condition, wherein the fourth determination means may determine, in the case where the third determination means determines that the reproduction state of the image is of the predetermined state, whether or not the reproduction state of the image-related sound corresponding to the image satisfies a reproduction state condition associated with the reproduction state describing sound data, and the reproduction state describing sound reproduction means may reproduce, as the reproduction state describing sound, a sound based on the reproduction state describing sound data stored in the reproduction state describing sound data storage means in association with the reproduction state condition determined by the fourth determination means as satisfying the reproduction state condition. With the above, when the reproduction state of the image is of a predetermined state, it is possible to output a reproduction state describing sound having content in accordance with the reproduction state of the image-related sound corresponding to the image.

In still another embodiment of the present invention, the reproduction state condition may include at least one of a condition concerning whether or not the image-related sound is in a state of having been reproduced, a condition concerning whether or not the image-related sound is in a state of being reproduced, and a condition concerning whether or not the image-related sound is in a state of having not been reproduced yet. With the above, when the reproduction state of the image is of a predetermined state, it is possible to output a reproduction state describing sound indicating that the image-related sound corresponding to the image has been reproduced, a reproduction state describing sound indicating that the image-related sound corresponding to the image is being reproduced, or a reproduction state describing sound indicating that the image-related sound corresponding to the image is yet to be reproduced.

In still another embodiment of the present invention, the image-related sound reproduction means may sequentially reproduce a plurality of image-related sounds in a predetermined order, and the production state condition may include a condition concerning relation in order, in the case where the third determination means determines that the reproduction state of the image is of the predetermined state, between the image-related sound corresponding to the image and the image-related sound being reproduced by the image-related sound reproduction means. With the above, when the reproduction state of the image is of a predetermined state, it is possible to output a reproduction state describing sound which describes relation in reproduction order between the image-related sound corresponding to the image and the image-related sound being reproduced at that time.

In still another embodiment of the present invention, the game machine may further comprise replay data recording means for recording replay data for reproducing a replay image, wherein the image reproduction means may reproduce the replay image as the image, based on the replay data stored in the replay data recording means. With the above, when a replay image is shown on the monitor and a sound corresponding to the replay image is also output via the speaker, it is possible to reduce the sense of discomfort which the user feels due to unmatched replay image display timing and image-related sound output timing.

BEST MODE FOR CARRYING OUT THE INVENTION

In the following, one example of an embodiment of the present invention will be described in detail with reference to the accompanying drawings.

Figure 1:
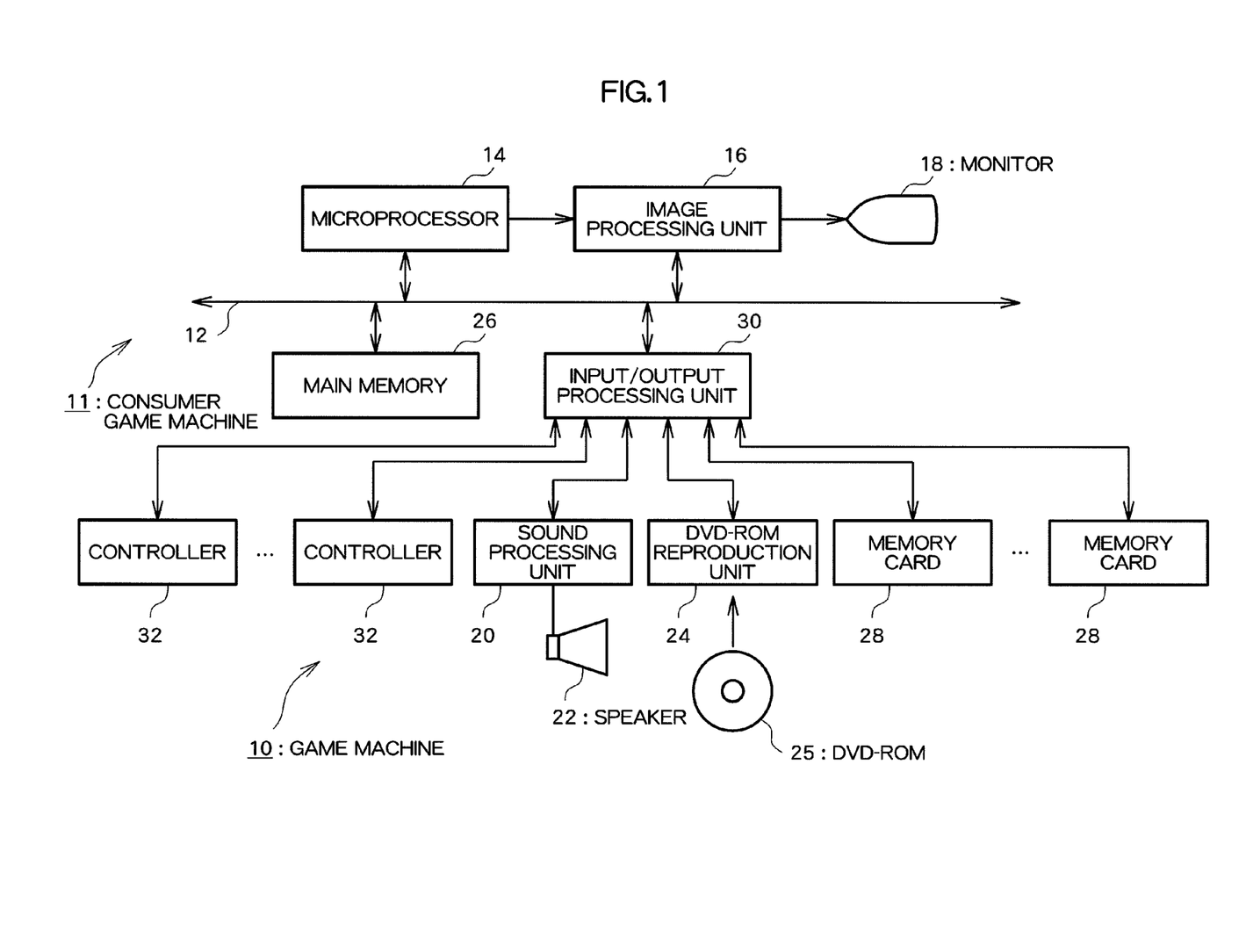
FIG. 1 is a diagram showing a hardware structure of a game machine according to this embodiment.

FIG. 1 is a diagram showing a structure of a game machine according to an embodiment of the present invention. The shown game machine 10 comprises a consumer game machine 11 having a DVD-ROM 25 and a memory card 28, or information storage media, mounted thereto, and a monitor 18 and a speaker 22 connected thereto. For example, the monitor 18 may be a home-use television set receiver; the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game machine 11. The microprocessor 14, the image processing unit 16, the main memory 26, and the input/output processing unit 30 are connected via the bus 12 for data exchange.

The microprocessor 14 controls the respective units of the consumer game machine 11 based on an operation system stored in a ROM (not shown), a program read from the DVD-ROM 25, and data read from the memory card 28. The main memory 26 comprises a RAM, for example, into which the program read from the DVD-ROM 25 and/or data read from the memory card 28 is written as required. The main memory 26 is used also as a working memory of the microprocessor 14.

The image processing unit 16, which comprises a VRAM, renders a game screen image into the VRAM based on the image data sent from the microprocessor 14, then converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20, which comprises a sound buffer, reproduces various sound data, such as game music, game sound effects, a message, and so forth, which is read from the DVD-ROM 25 and stored in the sound buffer, and outputs via the speaker 22.

The DVD-ROM reproduction unit 24 reads a program recorded in the DVD-ROM 25 according to an instruction sent from the microprocessor 14. It should be noted that although the DVD-ROM 25 is used here to provide a program to the consumer game machine 11, any other information storage medium, such as a CD-ROM, a ROM card, or the like, may be used. Alternatively, a program may be provided via a data communication network, such as the Internet, or the like, from a remote place to the consumer game machine 11.

The memory card 28 comprises a nonvolatile memory (for example, EEPROM, or the like). The consumer game machine 11 has a plurality of memory card slots defined therein each for accepting a memory card 28, so that a plurality of memory cards 28 can be inserted into the consumer game machine 11 at the same time. The memory card 28 is removable the slot and stores various game data, such as saved data, or the like.

The controller 32 is a general purpose operation input means for inputting various game operations by the user. The input/output processing unit 30 scans the states of the respective units of the controller 32 at a constant cycle (every $\frac{1}{60}^{th}$ of a second, for example) and sends an operation signal describing the scanning result to the microprocessor 14 via the bus 12. The microprocessor 14 determines the game operation carried out by the user based on an operation signal. The consumer game machine 11 is adapted to connection to a plurality of controllers 32. The microprocessor 14 controls a game based on the operation signals input from the respective controllers 32.

Figure 2:
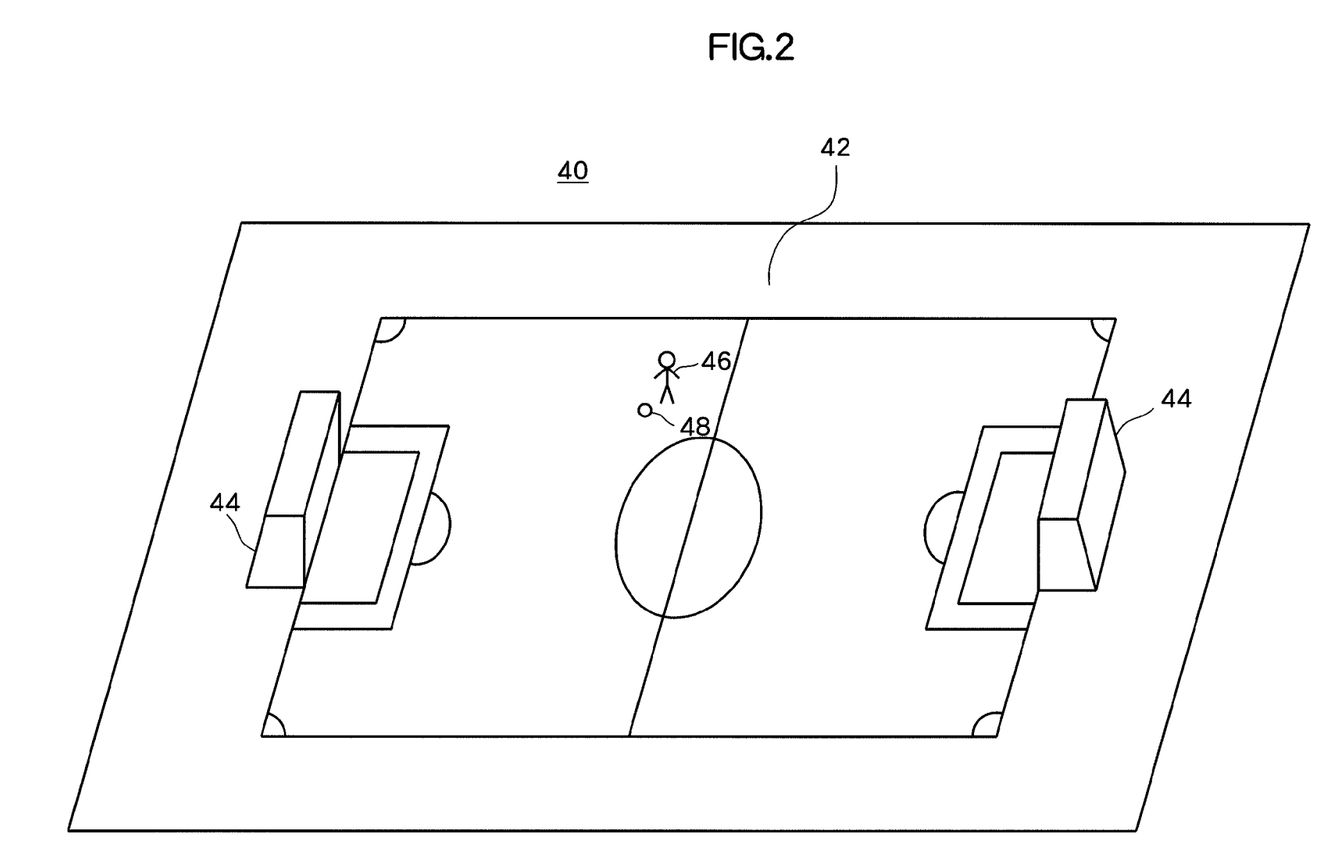
FIG. 2 is a diagram showing one example of a virtual three dimensional space.

In the game machine 10 having the above-described structure, a soccer game program read from the DVD-ROM 25 is executed to thereby provide a soccer game. In order to provide a soccer game, a virtual three dimensional space (a game space) such as is shown in FIG. 2, for example, is created in the main memory 26 in the game machine 10. As shown in FIG. 2, a field object 42 and goal objects 44, which represent a soccer pitch, are placed in the virtual three dimensional space 40, constituting a soccer pitch. On the field object 42, a player object 46 representative of a soccer player and a ball object 48 representative of a soccer ball are placed. Although only one player object 46 is shown in FIG. 2, eleven player objects 46 belonging to the operation target team for the user and eleven player objects 46 belonging to the opponent team are placed on the field object 42. A game screen image showing the picture obtained by viewing the virtual three dimensional space 40 from a predetermined viewpoint is shown on the monitor 18. The user operates the controller 32 while looking at the game screen, making an instruction concerning movement of the operation target player object 46.

In this embodiment, the soccer game has a highlight scene function. That is, like real soccer match TV broadcasting, a replay image of a scene where a specific play (shooting or the like, for example) happens is shown as a highlight scene after the match ends, together with the sound of a comment made by a commentator on the highlight scene.

Figure 3:
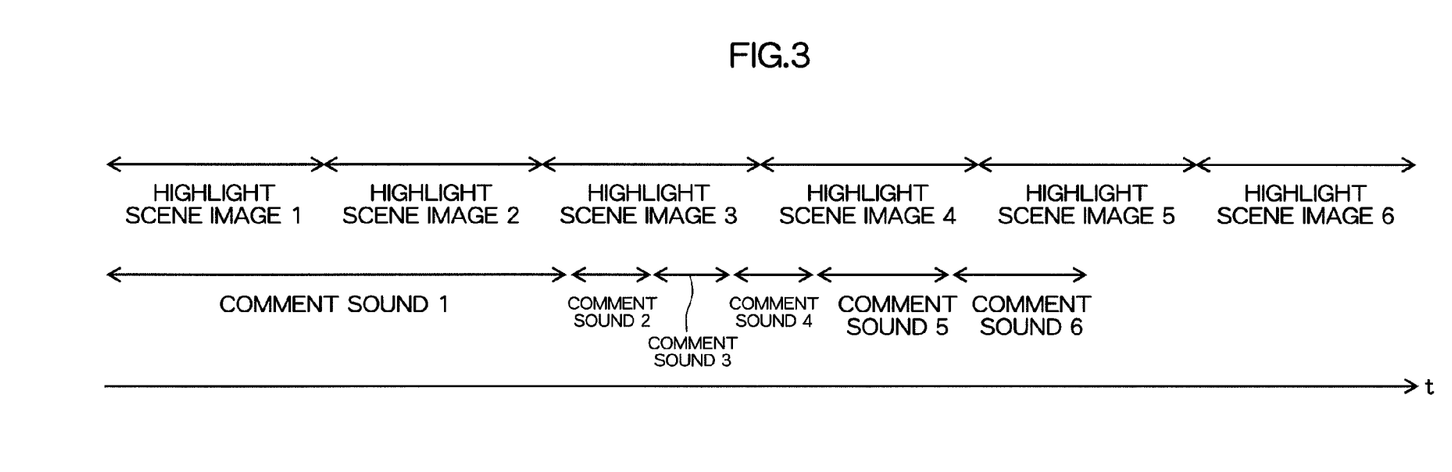
FIG. 3 is a diagram explaining reproduction of a highlight scene image and a comment sound.

FIG. 3 is a diagram showing one example of reproduction of a highlight scene image (a replay image) and that of a corresponding comment sound, which is realized using the highlight scene function. Specifically, FIG. 3 shows a case in which six highlight scene images are reproduced after the match ends, in which t represents a time axis. A comment sound n represents a comment sound corresponding to a highlight scene image n. Although it is arranged here that comment sounds are reproduced with respect to all highlight scene images, a comment sound may be reproduced only with respect to some of the highlight scene images.

In this embodiment, highlight scene images are shown on the monitor 18 in the order in accordance with the process of the match, and comment sounds are output via the speaker 22 in the same order as that of the highlight scene images. In this embodiment, once reproduction of a certain highlight scene image is completed, reproduction of the following highlight scene image begins even though reproduction of a comment sound corresponding to the completed highlight scene image is yet to be completed (see highlight scene images 1 and 2 in FIG. 3). Similarly, once reproduction of a certain comment sound is completed, reproduction of the following comment sound begins even though reproduction of the highlight scene image corresponding to the completed comment sound is yet to be completed (see comment sounds 3 and 4 in FIG. 3).

As reproduction of a highlight scene image is not synchronized with that of a corresponding comment sound in the game machine 10, as described above, the comment sound currently output via the speaker 22 may not always be the one corresponding to the highlight scene image currently shown on the monitor 18. In such a case, the user may feel uncomfortable. In view of the above, the game machine 10 aims to reduce the sense of discomfort the user may feel.

Specifically, before reproduction of a comment sound begins, the game machine 10 determines the reproduction state of a highlight scene image corresponding to that comment sound, then reproduces a sound (reproduction state describing sound) describing the reproduction state of the highlight screen image based on the determination result, and thereafter begins reproduction of the corresponding comment sound.

Like the comment sound 2 shown in FIG. 3, for example, in the case where reproduction of the highlight scene image 2 corresponding to a comment sound is already completed when reproduction of the comment sound begins, a reproduction state describing sound such as "as just shown on the screen" is reproduced, followed by reproduction of the comment sound after completion of the reproduction of the reproduction state describing sound.

Like the comment sound 3 shown in FIG. 3, for example, in the case where the highlight scene image 3 corresponding to a comment sound is being reproduced when reproduction of the comment sound begins, a reproduction state describing sound such as "as now being shown on the screen" is reproduced, followed by reproduction of the comment sound after completion of the reproduction of the reproduction state describing sound.

Like the comment sound 4 or 5 shown in FIG. 3, for example, in the case where the highlight scene image 4 or 5 corresponding to a comment sound is not reproduced when reproduction of the comment sound begins, but is about to be reproduced immediately after the currently shown highlight scene image, a reproduction state describing sound such as "as may appear shortly on the screen" is reproduced, followed by reproduction of the comment sound after completion of the reproduction of the reproduction state describing sound.

Like the comment sound 6 shown in FIG. 3, for example, in the case where reproduction of the highlight scene image 6 corresponding to a comment sound is not reproduced when reproduction of the comment sound begins, and not reproduced immediately after the currently shown highlight scene image, a reproduction state describing sound such as "as may be shown later on the screen" is reproduced, followed by reproduction of the comment sound after completion of the reproduction of the reproduction state describing sound.

Alternatively, before reproduction of a highlight scene image, the game machine 10 may determine the reproduction state of a comment sound corresponding to the highlight scene image, and reproduce a sound (a reproduction state describing sound) describing the reproduction state of the comment sound based on the determination result. For example, like the highlight scene image 5 shown in FIG. 3, in the case where reproduction of the comment sound 5 corresponding to the highlight scene image is completed when reproduction of the highlight scene image begins, a reproduction state describing sound such as "this is the scene mentioned earlier", for example, may be reproduced.

The game machine 10 is arranged so as to output a reproduction state describing sound such as is described above so that the user may feel as if reproduction of a highlight scene image were synchronized with output of a corresponding comment sound. This arrangement can reduce the sense of discomfort the user may feel due to unmatched highlight scene image display timing and highlight scene image-related sound output timing.

Figure 4:
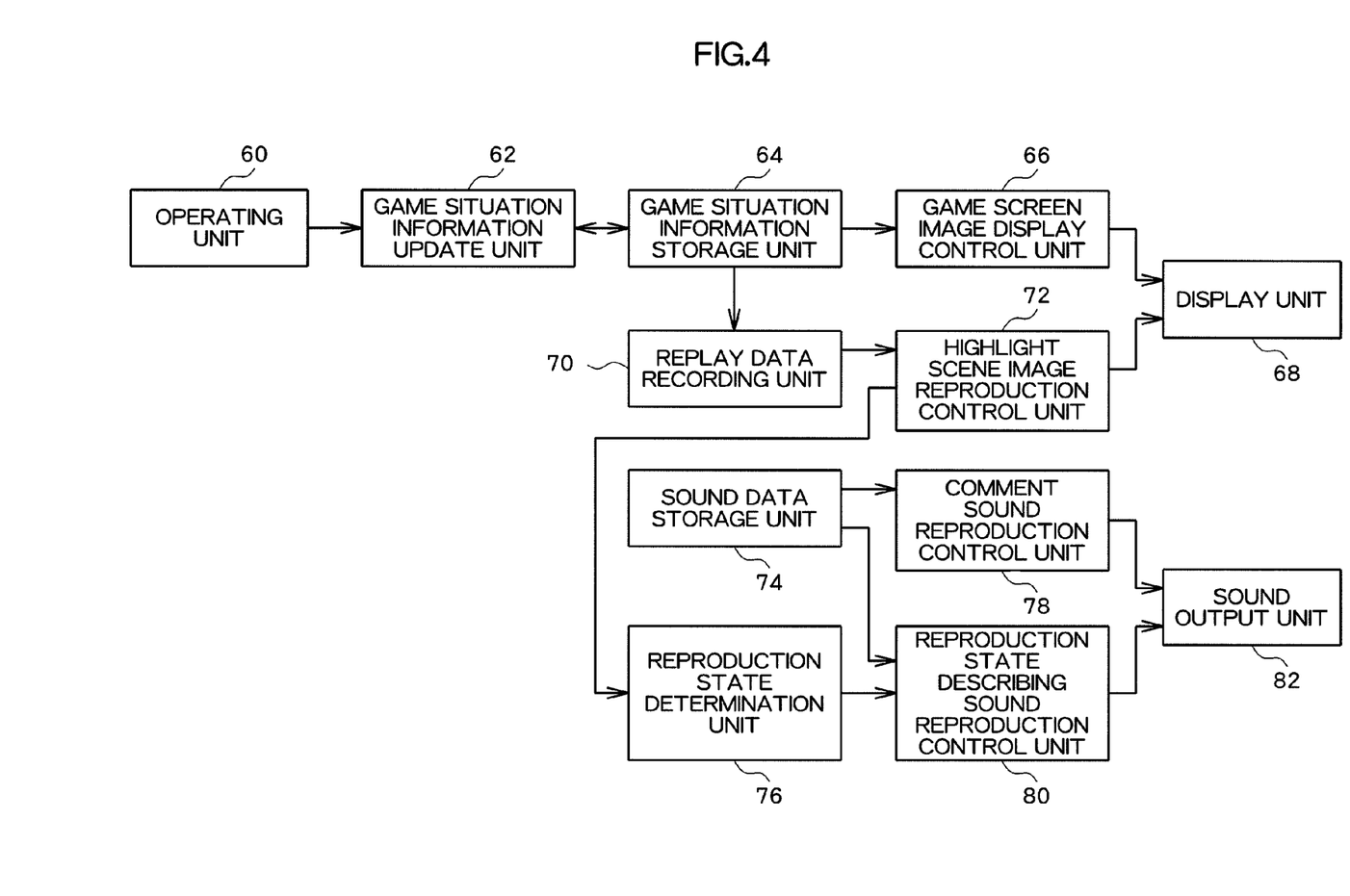
FIG. 4 is a functional block diagram of the game machine according to this embodiment.

FIG. 4 is a functional block diagram mainly showing the function according to the present invention among those realized in the game machine 10. As shown in FIG. 4, the game machine 10 comprises, in terms of functions, an operating unit 60, a game situation information update unit 62, a game situation information storage unit 64, a game screen image display control unit 66, a display unit 68, a replay data recording unit 70, a highlight scene image reproduction control unit 72, a sound data storage unit 74, a reproduction state determination unit 76, a comment sound reproduction control unit 78, a reproduction state describing sound reproduction control unit 80, and a sound output unit 82. These functions are realized by executing a program read from the DVD-ROM 25, by the microprocessor 14.

Initially, a functional block for realizing a basic function of a soccer game (a function for providing a game which imitates a soccer match) will be described. The operating unit 60, the game situation information update unit 62, the game situation information storage unit 64, the game screen image display control unit 66, and the display unit 68 are functional blocks for realizing the basic function.

[Operating Unit]

The operating unit 60 is realized using the controller 32 as a main component. The operating unit 60 provides operation information which describes the state of operation of the controller 32 to the game situation information update unit 62 every predetermined period of time ($\frac{1}{60}^{th}$ of a second in this embodiment).

[Game Situation Information Storage Unit]

The game situation information storage unit 64 is realized using the main memory 26 as a main component. The game situation information storage unit 64 stores game situation information which describes a game situation. The game situation information describes the state (position, posture, and so forth) of each player object 46 and the ball object 48 in the virtual three dimensional space 40, for example.

In this embodiment, the game situation information storage unit 64 stores not only information which describes the current state of each player object 46 and the ball object 48 but also information which describes the state of each player object 46 and the ball object 48 every predetermined period of time ($1/60^{th}$ of a second, for example) during the period from a moment a predetermined period of time (ten seconds, for example) prior to the current moment, to the current moment. That is, variation in the state of each player object 46 and the ball object 4 during the period from the moment a predetermined period of time prior to the current moment, to the current moment, is held in the game situation information storage unit 64.

[Game Situation Information Update Unit]

The game situation information update unit 62 is realized using the microprocessor 14 as a main component. The game situation information update unit 62 updates the game situation information stored in the game situation information storage unit 64. For example, the game situation information update unit 62 updates the current states of the user operation target player object 46 and ball object 48, held in the game situation information storage unit 64, based on the operation information supplied from the operating unit 60. For example, the game situation information update unit 62 updates the current state of the player object 46 other than the user operation target player object 46, held in the game situation information storage unit 64, according to a predetermined algorithm.

[Game Screen Image Display Control Unit and Display Unit]

The game screen image display control unit 66 is realized using the microprocessor 14 and image processing unit 16 as main components. The display unit 68 is realized using the monitor 18 as a main component. For example, the game screen image display control unit 66 creates a game screen image of a picture obtained by viewing, from a predetermined viewpoint, "a virtual three dimensional space 40 where the respective player objects 46 and the ball object 48 are placed, based on the current states of the respective player objects 46 and ball object 48, held in the game situation information storage unit 64", and controls the display unit 68 so as to display the game screen image.

In the following, a functional block for realizing the highlight scene function will be described. The replay data recording unit 70, highlight scene image reproduction control unit 72, sound data storage unit 74, reproduction state determination unit 76, comment sound reproduction control unit 78, reproduction state describing sound reproduction control unit 80, and sound output unit 82 are functional blocks for realizing the highlight scene function.

[Replay Data Recording Unit]

The replay data recording unit 70 is realized using the microprocessor 14 and main memory 26 as main components. The replay data recording unit 70 records replay data for reproducing the varying states of the respective player objects 46 and ball object 48.

The replay data recording unit 70 determines whether or not a play belonging to a predetermined play type which can be a highlight scene (shoot with or without scoring, for example) happens in the game. This determination is made based on the content stored in the game situation information storage unit 64. With a determination that any play which belongs to the above-described predetermined play type happens, the replay data recording unit 70 reads "information which describes the states of the respective player objects 46 and the ball object 48 every predetermined period of time ($1/60^{th}$ of a second, for example) during the period from the moment a predetermined period of time (ten seconds, for example) prior to the current moment, to the current moment", held in the game situation information storage unit 64, and stores as replay data. For example, in the case where six specific plays which can be highlight scenes happen in the match, six replay data items are resultantly recorded in the replay data recording unit 70 by the end of the match.

Figure 5:
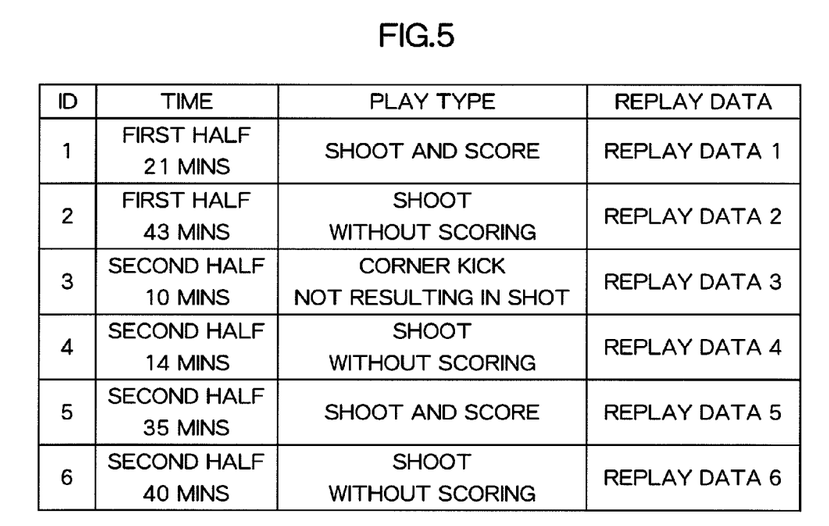
FIG. 5 is a diagram showing one example of content stored in a replay data recording unit.

FIG. 5 shows one example of content stored in the replay data recording unit 70. In the shown example, an ID for uniquely identifying replay data, a time at which a play belonging to any of the predetermined play types happens, the play type, and the replay data are stored in association with one another. Replay data having an ID "n" is denoted as replay data n here. The highlight scene image n, shown in FIG. 3, is a highlight scene image (a replay image) to be reproduced based on the replay data n.

[Highlight Scene Image Reproduction Control Unit]

The highlight scene image reproduction control unit 72 (image reproduction means) is realized using the microprocessor 14 and image processing unit 16 as main components. The highlight scene image reproduction control unit 72 sequentially reproduces a plurality of highlight scene images (images) based on the replay data stored in the replay data recording unit 70. In this embodiment, the highlight scene image reproduction control unit 72 sequentially reads the replay data stored in the replay data recording unit 70, beginning with the oldest one. After the reading of the replay data from the replay data recording unit 70, the highlight scene image reproduction control unit 72 controls the display unit 68 so as to display the replay image reproduced based on the replay data as a highlight scene image. The highlight scene image shows the picture of the virtual three dimensional space 40 (the respective player objects 46, the ball object 48, and so forth), reproduced based on the replay data. With the highlight scene image reproduction completed, the highlight scene image reproduction control unit 72 begins reproduction of the following highlight scene image.

[Sound Data Storage Unit]

Figure 6:
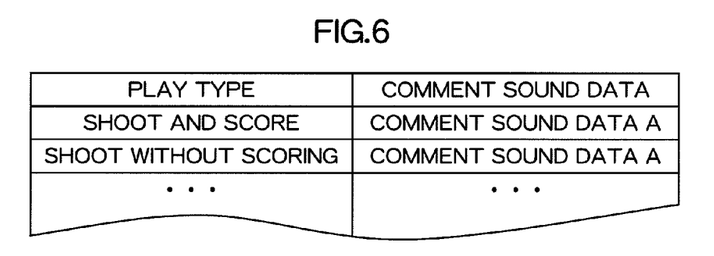
FIG. 6 is a diagram showing one example of content stored in a sound data storage unit.

The sound data storage unit 74 is realized using the DVD-ROM 25 and main memory 26 as main components. The sound data storage unit 74 stores comment sound data for reproducing a comment sound. For example, the sound data storage unit 74 stores comment sound data in association with a predetermined play type. That is, the sound data storage unit 74 stores one or more comment sound data items for every predetermined play type. FIG. 6 shows one example of the content (concerning comment sound data) stored in the sound data storage unit 74.

The sound data storage unit 74 (reproduction state describing sound data storage means) stores reproduction state describing sound data for reproducing a reproduction state describing sound. In this embodiment, the sound data storage unit 74 stores reproduction state describing sound data in association with a condition (reproduction state condition) concerning the reproduction state of a highlight scene image.

Here, a reproduction state condition is a condition concerning whether or not reproduction of a highlight scene image has been completed, for example. Alternatively, the reproduction state condition is a condition concerning whether or not a highlight scene image is being reproduced, for example.

Figure 7:
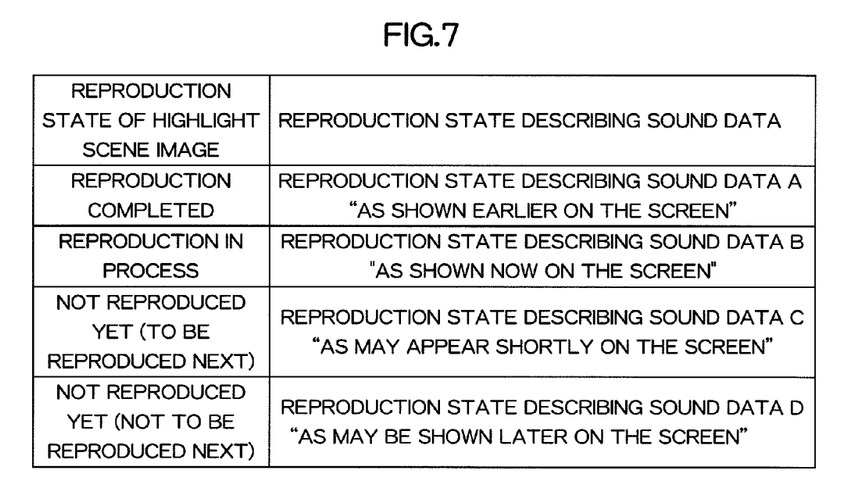
FIG. 7 is a diagram showing one example of content stored in the sound data storage unit.

Still alternatively, the reproduction state condition is a condition concerning whether or not a highlight scene image is yet to be reproduced. The reproduction state condition is a condition concerning relation in order between the highlight scene image corresponding to the comment sound reproduced by the comment sound reproduction control unit 78 to be described later and the highlight scene image being currently reproduced by the highlight scene image reproduction control unit 72. More specifically, the reproduction state condition is a condition concerning whether or not the highlight scene image corresponding to the comment sound reproduced by the comment sound reproduction control unit 78 is about to be reproduced immediately after the highlight scene image being currently reproduced by the highlight scene image reproduction control unit 72. FIG. 7 shows one example of content (concerning reproduction state describing sound data) stored in the sound data storage unit 74.

For an arrangement in which the reproduction state of a comment sound corresponding to a highlight scene image is determined before reproduction of that highlight scene image or the like so that a sound describing the reproduction state of the comment sound is reproduced based on the determined result, the sound data storage unit 74 may store reproduction state describing sound data in association with a condition (reproduction state condition) concerning the reproduction state of a comment sound. In this case, similar to the above, the reproduction state condition may be a condition concerning, for example, whether or not reproduction of the comment sound has been completed, whether or not the comment sound is being reproduced, or whether or not the comment sound is yet to be reproduced. Alternatively, the reproduction state condition may be a condition concerning relation in order between a comment sound corresponding to the highlight scene image reproduced by the highlight scene image reproduction control unit 72 and the comment sound being currently reproduced by the comment sound reproduction control unit 78 to be described later.

[Comment Sound Reproduction Control Unit and Sound Output Unit]

The comment sound reproduction control unit 78 (image-related sound reproduction means) is realized using the microprocessor 14 and sound processing unit 20 as main components. The sound output unit 82 is realized using the speaker 22 as a main component. The comment sound reproduction control unit 78 reproduces a comment sound corresponding to a highlight scene image (image-related sound). For example, the comment sound reproduction control unit 78 sequentially obtains the play type of the replay data recorded in the replay data recording unit 70, beginning with the oldest one. With the play type of the replay data obtained, the comment sound reproduction control unit 78 reads comment sound data corresponding to that play type, and controls the sound output unit 82 so as to output a comment sound based on the comment sound data. With the comment sound reproduction completed, the comment sound reproduction control unit 78 begins reproduction of the next comment sound.

[Reproduction State Determination Unit]

The reproduction state determination unit 76 determines whether or not the reproduction state of a highlight scene image and that of a comment sound corresponding to that highlight scene image satisfy a predetermined condition. In this embodiment, the reproduction state determination unit 76 (first determination means) determines whether or not the reproduction state of the comment sound is of a predetermined state. Specifically, the reproduction state determination unit 76 determines whether or not the reproduction state of the comment sound is of "the state before reproduction of that comment sound begins and after reproduction of the comment sound prior to that comment sound is finished". When it is determined that the reproduction state of the comment sound is of the predetermined state, the reproduction state determination unit 76 (second determination means) determines whether or not the reproduction state of the highlight scene image corresponding to that comment sound satisfies a predetermined reproduction state condition. In this embodiment, when it is determined that the reproduction state of the comment sound is of a predetermined state, the reproduction state determination unit 76 determines whether or not the reproduction state of the highlight scene image corresponding to the comment sound satisfies the reproduction state condition associated with the reproduction state describing sound data.

It should be noted that in an arrangement in which the reproduction state of a comment sound corresponding to a highlight scene image is determined before reproduction of the highlight scene image begins, or the like, and a sound describing the reproduction state of the comment sound is reproduced based on the determined result, the reproduction state determination unit 76 (third determination means) may determine whether or not the reproduction state of the highlight scene image is of a predetermined state. Specifically, the reproduction state determination unit 76 determines whether or not the reproduction state of the highlight scene image is of "the state before reproduction of the highlight scene image begins and after reproduction of the highlight scene image immediately prior to that highlight scene image is finished". Then, upon determination that the reproduction state of the highlight scene image is of a predetermined state, the reproduction state determination unit 76 (fourth determination means) determines whether or not the reproduction state of a comment sound corresponding to the highlight scene image satisfies a predetermined reproduction state condition. For example, in the case where reproduction state describing sound data is stored in the sound data storage unit 74 in association with a condition (reproduction state condition) concerning the reproduction state of a comment sound, the reproduction state determination unit 76 may determine, upon determination that the reproduction state of the highlight scene image is of a predetermined state, whether or not the reproduction state of a comment sound corresponding to that highlight scene image satisfies the reproduction state condition associated with the reproduction state describing sound data.

[Reproduction State Describing Sound Reproduction Control Unit]

The reproduction state describing sound reproduction control unit 80 (reproduction state describing sound reproduction means) reproduces a reproduction state describing sound based on the result of determination by the reproduction state determination unit 76. In this embodiment, the reproduction state describing sound reproduction control unit 80 reads reproduction state describing sound data associated with the reproduction state condition which is determined by the reproduction state determination unit 76 as satisfying the reproduction state condition, from the sound data storage unit 74, and controls the sound output unit 82 so as to output a reproduction state describing sound based on the reproduction state describing sound data.

Figure 8:
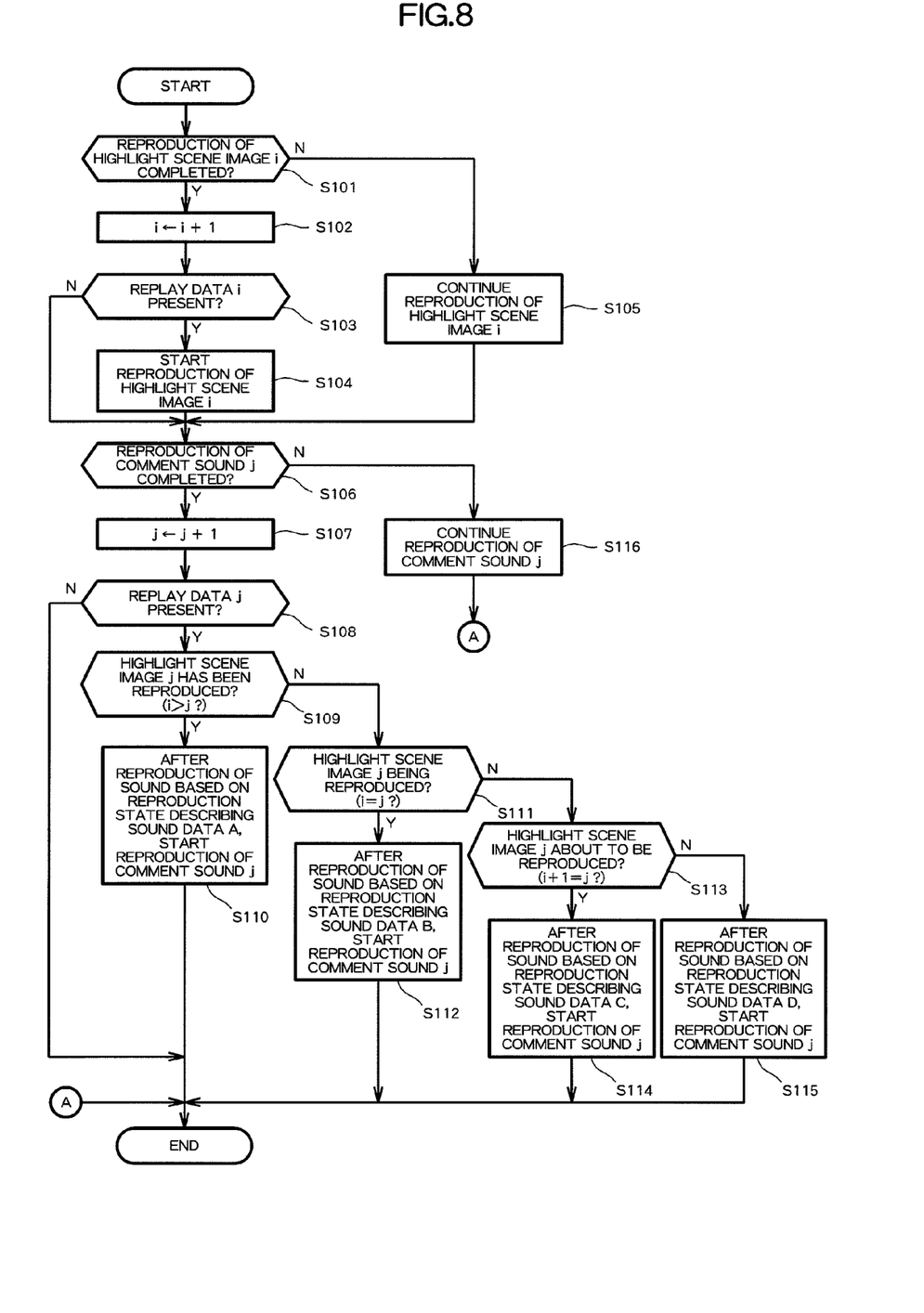
FIG. 8 is a flowchart of a process to be carried out in the game machine.

In the following, a process to be carried out by the game machine 10 will be described. FIG. 8 is a flowchart mainly concerning a process according to the present invention among those to be carried out in the game machine 10 every predetermined period of time (¹⁄₆₀th of a second in this embodiment). FIG. 8 shows a process to be carried out every predetermined period of time during the period after reproduction of the highlight scene image 1 and comment sound 1 begins and before reproduction of the highlight scene image 6 and comment sound 6 is finished. This process is realized by executing a program read from the DVD-ROM 25 by the microprocessor 14.

As shown in FIG. 8, in this processing, whether or not the reproduction of the highlight scene image i is completed is determined (S101), in which i represents the variable of the initial value 1, of which value is held in the main memory 26. In this embodiment, the value of the variable i specifies a highlight scene image being reproduced, a highlight scene image having been reproduced, and a highlight scene image yet to be reproduced. The highlight scene image to be reproduced next is also specified by the value of the variable i.

When it is determined that reproduction of the highlight scene image i is yet to be completed, the reproduction of the highlight scene image i is continued (S105). Meanwhile, when it is determined that reproduction of the highlight scene image i is already completed, the value of the variable i is incremented (S102), and whether or not there is replay data i is then determined (S103). When it is determined that there is replay data i, reproduction of the highlight scene image i begins (S104). Specifically, replay data i is read from the replay data recording unit 70, and a replay image is reproduced based on the replay data i.

Thereafter, whether or not reproduction of a comment sound j is completed is determined (S106), in which j represents the variable of an initial value 1, the value of which is held in the main memory 26. In this embodiment, the value of the variable j specifies a comment sound being reproduced, a comment sound having been reproduced, and a comment sound yet to be reproduced. When it is determined that reproduction of the comment sound j is yet to be completed, the reproduction of the comment sound j is continued (S116). Meanwhile, when it is determined that reproduction of the comment sound j is completed, the value of the variable j is incremented (S107), and whether or not there is replay data j is then determined (S108).

When it is determined that there is replay data j, whether or not the highlight scene image j has already been reproduced is then determined (S109). Specifically, in this embodiment, whether or not the value of the variable j is smaller than the value of the variable i is determined. Then, when it is determined that the highlight scene image j has already been reproduced, reproduction state describing sound data A is read, and a sound based on the read reproduction state describing sound data A is output, and then reproduction of the comment sound j begins (S110). In this case, reproduction of the comment sound j is restricted (refrained from) until completion of the sound reproduction based on the reproduction state describing sound data A.

Meanwhile, when it is determined that reproduction of the highlight scene image j is yet to be completed, whether or not the highlight scene image j is being reproduced is then determined (S111). Specifically, in this embodiment, whether or not the value of the variable j is equal to the value of the variable i is determined. When it is determined that the highlight scene image j is being reproduced, the reproduction state describing sound data B is read, and a sound based on the reproduction state describing sound data B is reproduced, and then reproduction of the comment sound j begins (S112). In this case as well, reproduction of the comment sound j is restricted (refrained from) until completion of the sound reproduction based on the reproduction state describing sound data B.

Meanwhile, when it is determined that the highlight scene image j is not being reproduced, whether or not the highlight scene image j is about to be reproduced next is then determined (S113). Specifically, in this embodiment, whether or not the value of the variable j is larger than the value of the variable i by one is determined. When it is determined that the highlight scene image j is about to be reproduced next, the reproduction state describing sound data C is read, a sound based on the reproduction state describing sound data C is reproduced, and then reproduction of the comment sound j begins (S114). In this case as well, reproduction of the comment sound j is restricted (refrained from) until completion of the sound reproduction based on the reproduction state describing sound data C.

Meanwhile, when it is determined that the highlight scene image j is not about to be reproduced next, reproduction state describing sound data D is read, a sound based on the reproduction state describing sound data D is reproduced, and then reproduction of the comment sound j begins (S115). In this case as well, reproduction of the comment sound j is restricted (refrained) until completion of the sound reproduction based on the reproduction state describing sound data D.

As described above, according to the game machine 10, the reproduction state of a highlight scene image corresponding to a comment sound is determined before reproduction of that comment sound, and a sound, such as "as shown earlier on the screen" or "as will appear soon on the screen", for example, which describes the reproduction state of the highlight scene image is reproduced based on the determined result, followed by the reproduction of the comment sound. Therefore, according to the game machine 10, it is possible to make the user feel as if reproduction of a highlight scene image is synchronized with that of the corresponding comment sound, thus feeling less of a sense of discomfort due to the unmatched highlight scene image display timing and highlight scene-related sound output timing. In addition, according to the game machine 10, as there is no need to execute a complicated process which would otherwise be required in establishing synchronism between a highlight scene image display timing and a highlight scene-related sound output timing, it is possible to reduce, through relatively simple processing, the sense of discomfort which the user may feel.

It should be noted that the present invention is not limited to the above-described embodiment.

For example, the reproduction state determination unit 76 (first determination means) may determine whether or not the reproduction state of a comment sound is the state of being reproduced. Then, when it is determined that the reproduction state of a comment sound is of the state of being reproduced, the reproduction state determination unit 76 (second determination means) determines the reproduction state of a highlight scene image corresponding to that comment sound. That is, the reproduction state determination unit 76 may determine, at any time during the reproduction of the comment sound by the comment sound reproduction control unit 78, the reproduction state of a highlight scene image corresponding to that comment sound. Then, the reproduction state describing sound reproduction control unit 80 may reproduce a reproduction state describing sound during the reproduction of the comment sound. As described above, it may be arranged such that, for example, while a commentator is making a comment on a highlight scene image, another person (a live announcer, an announcer, or the like) may interrupt by saying "which is being shown on the screen now", or the like. Similarly, in an arrangement in which the reproduction state of a comment sound corresponding to a highlight scene image is determined and a sound describing the reproduction state of the comment sound is reproduced based on the determined result, the reproduction state determination unit 76 (third determination means) may determine whether or not the reproduction state of the highlight scene image is the state of being reproduced. Then, upon determination that the reproduction state of the highlight scene image is the state of being reproduced, the reproduction state determination unit 76 (fourth determination means) may determine the reproduction state of a comment sound corresponding to the highlight scene image.

Alternatively, for example, the reproduction state condition associated with a reproduction state describing sound data may include a condition (a time range) concerning a period of time to elapse before reproduction of a highlight scene image corresponding to a comment sound begins. In this case, when a highlight scene image corresponding to the comment sound reproduced by the comment sound reproduction control unit 78 is yet to be reproduced, the reproduction state determination unit 76 may obtain the period of time to elapse before reproduction of that highlight scene image begins, and the reproduction state describing sound reproduction control unit 80 controls the sound output unit 82 so as to output a sound based on the reproduction state describing sound data associated with the time range which contains the period of time obtained by the reproduction state determination unit 76. In this manner, in the case where the highlight scene image corresponding to the comment sound reproduced by the comment sound reproduction control unit 78 is yet to be reproduced, a reproduction state describing sound having different content depending on the period of time to elapse before reproduction of that highlight scene image begins may be output. For example, in the case where the period of time to elapse before reproduction of the highlight scene image begins is shorter than a predetermined reference period of time, a reproduction state describing sound such as "as may appear shortly on the screen . . . , yes, here it is now" may be reproduced, and in the case where the period is equal to or longer than the predetermined reference period of time, a reproduction state describing sound such as "as may be shown later on the screen" may be reproduced. In this case, the length of the reference period of time may be determined based on the length of the period of time required to reproduce the reproduction state describing sound ("as may appear shortly on the screen . . . , yes, here it is now"). With the above, when a highlight scene image corresponding to a comment sound is yet to be reproduced and that highlight scene images is about to be reproduced next, a reproduction state describing sound having different content depending on the period of time to elapse before reproduction of the highlight scene image begins may be output. Similarly, for an arrangement in which the reproduction state of a comment sound corresponding to a highlight scene image is determined before reproduction of that highlight scene image begins, or the like, and a sound describing the reproduction state of the comment sound is reproduced based on the determined result, the reproduction state condition associated with the reproduction state describing sound data may include a condition (a time range) concerning the period of time to elapse before reproduction of the comment sound corresponding to a highlight scene image begins.

Further, for example, application of the present invention is not limited to reproduction of a highlight scene image (replay image) and that of a corresponding comment sound. For example, the present invention may be applicable to a case in which, in a scene of entry of players into the ground before a match, an image (image 1) of the entire stadium, an image (image 2) of the players entering the stadium, and a close-up image (image 3) of the faces of the players, are sequentially shown on the monitor, while a sound (sound 1) describing the pitch condition or the like of the stadium or the like, a sound (sound 2) presenting performance of the team or the like in matches, and a sound (sound 3) presenting a comment made by a specific player before the match, are sequentially output. In this case, it can be arranged such that, for example, when the sound (sound 3) presenting a comment made by a specific player before the match is output, followed by the close-up image (image 3; an image corresponding to the sound 3) of that player's face, a sound (reproduction state describing sound) such as "this is the player who made the comment before", for example, may be output. The present invention is applicable to any aspect in which an image and a sound corresponding to that image are reproduced.

Still further, for example, application of the present invention is not limited to a soccer game, and the present invention can be applied to any sport games other than a soccer game, as well as any game other than a sport game.

Figure 9:
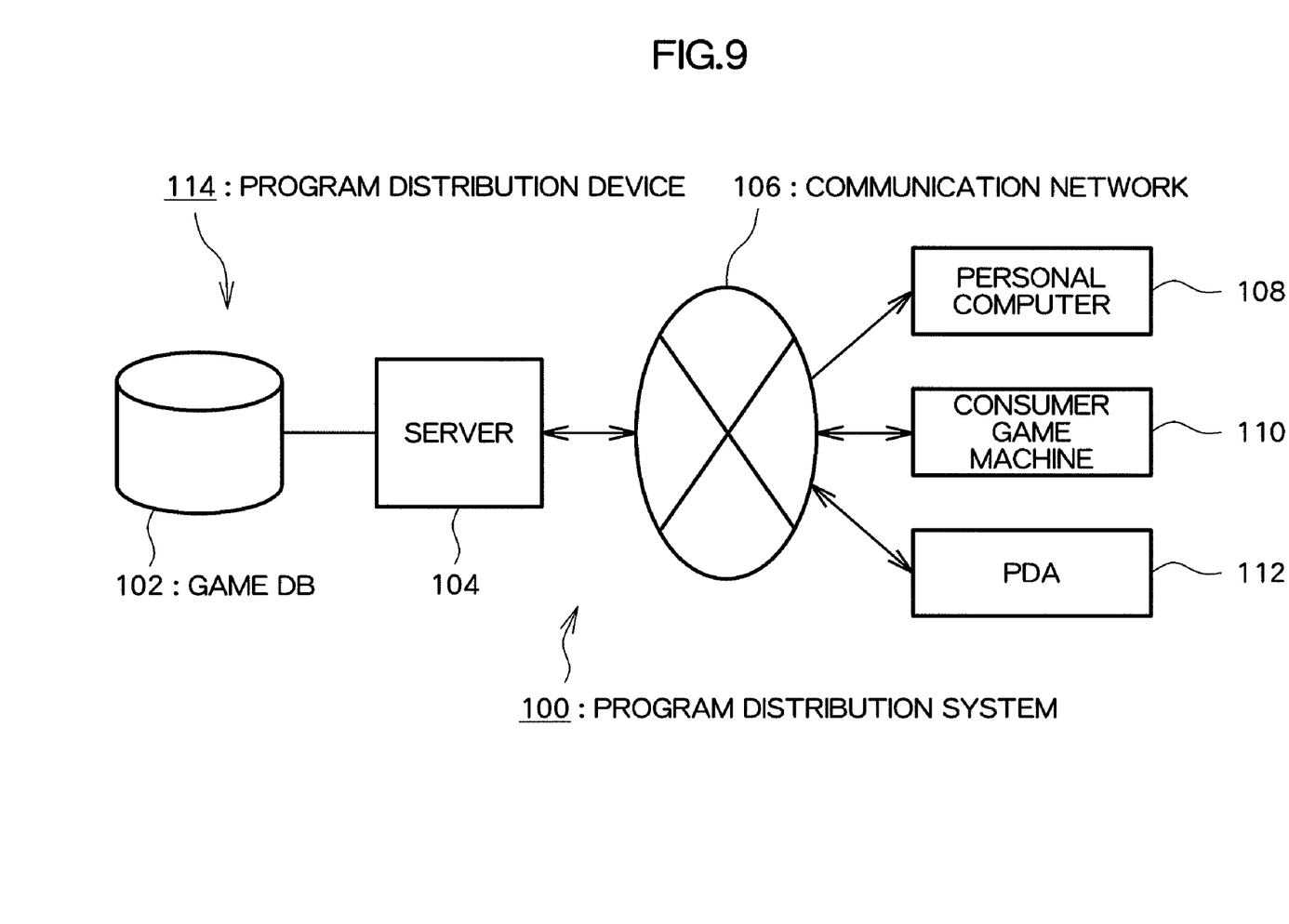
FIG. 9 is a diagram showing an entire structure of a program distribution system according to another embodiment of the present invention.

Although it is described in the above that the program is supplied from a DVD-ROM 25, or an information storage medium, to the consumer game machine 11, the program may be distributed via a communication network to a home or the like. FIG. 9 is a diagram showing an overall structure of a program distribution system using a communication network. Referring to FIG. 9, a program distribution method according to the present invention will be described. As shown, the program distribution system 100 comprises a game database 102, a server 104, a communication network 106, a personal computer 108, a consumer game machine 110, and a PDA (a personal digital assistant) 112. Among those structural elements, the game database 102 and server 104 together constitute a program distribution device 114. The communication network 106 comprises, for example, the Internet and/or a cable television network. In this system, the game database 102 (an information storage medium) stores a program having content that is identical to that recorded in the DVD-ROM 25. Then, when the user wishing to obtain a game requests game distribution, using the personal computer 108, the consumer game machine 110, the PDA 112, or the like, the request is transmitted via the communication network 106 to the server 104. Then, in response to the game distribution request, the server 104 reads the program from the game database 102, and sends to the entity, such as the personal computer 108, the consumer game machine 110, the PDA 112, or the like, having made the game distribution request. Here, although it is described in the above that game distribution is carried out in response to a game distribution request, the server 104 may send a game unidirectionally. Also, all programs necessary to realize the game are not necessarily distributed all at once (collective distribution), but only game components necessary according to a particular aspect of the game may be distributed (divided distribution). As described above, game distribution via the communication network 106 makes it possible for the user wishing to obtain a program to readily obtain the program.

The invention claimed is:

1. A game machine, comprising:
   image reproduction means for reproducing a stored image of a previously played game;
   image-related sound reproduction means for reproducing a stored image-related sound corresponding to the image of the previously played game;
   reproduction state determination means for determining whether or not a reproduction state of the image and a reproduction state of the image-related sound corresponding to the image satisfy a predetermined condition; and reproduction state describing sound reproduction means for reproducing, based on a result of a determination by the reproduction state determination means, a stored reproduction state describing sound, which describes the reproduction state of the image and/or the image-related sound.

2. The game machine according to claim 1, wherein the reproduction state determination means includes first determination means for determining whether or not the reproduction state of the image-related sound is of a predetermined state, and second determination means for determining, in the case where the first determination means determines that the reproduction state of the image-related sound is of the predetermined state, whether or not the reproduction state of an image corresponding to the image-related sound satisfies a predetermined reproduction state condition, and the reproduction state describing sound reproduction means reproduces, based on a result of a determination by the second determination means, the reproduction state describing sound which describes the reproduction state of the image.

3. The game machine according to claim 2, further comprising reproduction state describing sound data storage means for storing reproduction state describing sound data for reproducing the reproduction state describing sound, in association with the reproduction state condition, wherein the second determination means determines, in the case where the first determination means determines that the reproduction state of the image-related sound is of the predetermined state, whether or not the reproduction state of the image corresponding to the image-related sound satisfies the reproduction state condition associated with the reproduction state describing sound data, and the reproduction state describing sound reproduction means reproduces, as the reproduction state describing sound, a sound based on the reproduction state describing sound data stored in the reproduction state describing sound data storage means in association with the reproduction state condition determined by the second determination means as satisfying the reproduction state condition.

4. The game machine according to claim 2, wherein the reproduction state condition includes at least one of a condition concerning whether or not the image is in a state of having been reproduced, a condition concerning whether or not the image is in a state of being reproduced, and a condition concerning whether or not the image is in a state of having not been reproduced yet.

5. The game machine according to claim 2, wherein the image reproduction means sequentially reproduces a plurality of images in a predetermined order, and the reproduction state condition includes a condition concerning relation in order, in the case where the first determination means determines that the reproduction state of the image-related sound is of the predetermined state, between the image corresponding to the image-related sound and the image being reproduced by the image reproduction means.

6. The game machine according to claim 1, wherein the reproduction state determination means includes third determination means for determining whether or not a reproduction state of the image is of a predetermined state, and fourth determination means for determining, in the case where the third determination means determines that the reproduction state of the image is of the predetermined state, whether or not the reproduction state of the image-related sound corresponding to the image satisfies a predetermined reproduction state condition, and the reproduction state describing sound reproduction means reproduces, according to a result of a determination by the fourth determination means, the reproduction state describing sound which describes the reproduction state of the image-related sound.

7. The game machine according to claim 6, further comprising:

reproduction state describing sound data storage means for storing reproduction state describing sound data for reproducing the reproduction state describing sound, in association with the reproduction state condition, wherein the fourth determination means determines, in the case where the third determination means determines that the reproduction state of the image is of the predetermined state, whether or not the reproduction state of the image-related sound corresponding to the image satisfies the reproduction state condition associated with the reproduction state describing sound data, and the reproduction state describing sound reproduction means reproduces, as the reproduction state describing sound, a sound based on the reproduction state describing sound data stored in the reproduction state describing sound data storage means in association with the reproduction state condition determined by the fourth determination means as satisfying the reproduction state condition.

8. The game machine according to claim 6, wherein the reproduction state condition includes at least one of a condition concerning whether or not the image-related sound is in a state of having been reproduced, a condition concerning whether or not the image-related sound is in a state of being reproduced, and a condition concerning whether or not the image-related sound is in a state of having not been reproduced yet.

9. The game machine according to claim 6, wherein the image-related sound reproduction means sequentially reproduces a plurality of image-related sounds in a predetermined order, and the reproduction state condition includes a condition concerning relation in order, in the case where the third determination means determines that the reproduction state of the image is of the predetermined state, between the image-related sound corresponding to the image and the image-related sound being reproduced by the image-related sound reproduction means.

10. A game machine according to any one of claims 1 to 9, further comprising replay data recording means for recording replay data for reproducing a replay image, wherein the image reproduction means reproduces the replay image as the image, based on the replay data stored in the replay data recording means.

11. A game machine control method comprising, an image reproduction step of reproducing a stored image of a previously played game using the machine;

an image-related sound reproduction step of reproducing a stored image-related sound corresponding to the image of the previously played game;
a reproduction state determination step of determining whether or not a reproduction state of the image and a reproduction state of the image-related sound corresponding to the image satisfy a predetermined condition using the machine; and
a reproduction state describing sound reproduction step of reproducing using the machine, based on a result of a determination made at the reproduction state determination step, a stored reproduction state describing sound which describes the reproduction state of the image and/or the image-related sound.

12. A computer readable information storage medium storing in non-transitory form a program for causing a computer to function as a game machine, the computer functioning as;

image reproduction means for reproducing a stored image of a previously played game;
image-related sound reproduction means for reproducing a stored image-related sound corresponding to the image of the previously played game;
reproduction state determination means for determining whether or not a reproduction state of the image and a reproduction state of the image-related sound corresponding to the image satisfy a predetermined condition; and
reproduction state describing sound reproduction means for reproducing, based on a result of a determination by the reproduction state determination means, a stored reproduction state describing sound which describes the reproduction state of the image and/or the image-related sound.

* * * * *